United States Patent
Bindl et al.

(10) Patent No.: US 8,746,362 B2
(45) Date of Patent: Jun. 10, 2014

(54) MULTI-WORM CIRCLE DRIVE GEARBOX

(75) Inventors: Reginald M. Bindl, Dubuque, IA (US);
Francisco Ruiz, Madrid (ES); Angel Torrado, Madrid (ES); Trent A. Luoma, Dubuque, IA (US); Nathan J. Horstman, Durango, IA (US)

(73) Assignee: Deere & Company, Moline, IL (US)

( * ) Notice: Subject to any disclaimer, the term of this patent is extended or adjusted under 35 U.S.C. 154(b) by 188 days.

(21) Appl. No.: 13/241,607

(22) Filed: Sep. 23, 2011

(65) Prior Publication Data
US 2012/0073890 A1    Mar. 29, 2012

(30) Foreign Application Priority Data
Sep. 24, 2010  (ES) .................................. 201031423

(51) Int. Cl.
*E02F 3/00*         (2006.01)
(52) U.S. Cl.
USPC .......................................... 172/795; 172/781
(58) Field of Classification Search
USPC ............. 172/795, 796, 789; 74/89.29, 665 A, 74/665 C, 665 B, 665 D–665 K
See application file for complete search history.

(56) References Cited

U.S. PATENT DOCUMENTS

| | | | |
|---|---|---|---|
| 2,928,381 A * | 3/1960 | MacDonald | 91/186 |
| 3,712,384 A | 1/1973 | Fisher et al. | |
| 3,989,112 A | 11/1976 | Cole et al. | |
| 3,999,615 A | 12/1976 | Hart et al. | |
| 4,004,641 A * | 1/1977 | Hendrickson | 172/781 |
| 4,015,669 A * | 4/1977 | Cole | 172/796 |
| 4,084,644 A | 4/1978 | Cole et al. | |
| 4,113,032 A * | 9/1978 | Cole | 172/781 |
| 4,122,903 A * | 10/1978 | Cole | 172/781 |
| 4,173,321 A * | 11/1979 | Eickmann | 244/17.23 |
| 4,685,354 A * | 8/1987 | McCabria | 475/5 |
| 4,796,412 A * | 1/1989 | O'Neill | 53/473 |
| 4,819,507 A * | 4/1989 | Pescher | 74/665 GA |
| 5,135,442 A * | 8/1992 | Bossler, Jr. | 475/1 |
| 5,329,828 A * | 7/1994 | Hurth | 74/661 |
| 5,511,368 A * | 4/1996 | Kocher | 56/15.2 |
| 5,667,020 A * | 9/1997 | Palmer et al. | 172/781 |
| 6,216,394 B1 * | 4/2001 | Fenelon | 49/349 |
| 6,230,818 B1 | 5/2001 | Slunder | |
| 6,658,954 B1 * | 12/2003 | Bosa et al. | 74/409 |
| 6,851,486 B2 * | 2/2005 | Marshall | 172/792 |
| 6,886,655 B2 | 5/2005 | Varela | |
| 7,007,566 B2 * | 3/2006 | Norum | 74/335 |
| 7,552,661 B2 * | 6/2009 | Diana et al. | 74/440 |
| 7,555,970 B2 * | 7/2009 | Hawkes et al. | 74/665 A |
| 7,802,494 B2 * | 9/2010 | Batistic | 74/665 B |
| 2003/0192400 A1 * | 10/2003 | Cordeiro | 74/665 A |
| 2003/0233899 A1 * | 12/2003 | Ishiyama | 74/425 |
| 2010/0097732 A1 | 4/2010 | Dean | |

OTHER PUBLICATIONS

Background Information (1 page)(admitted as prior art before Sep. 24, 2010).

* cited by examiner

*Primary Examiner* — Matthew D Troutman

(57) ABSTRACT

A work vehicle comprises a frame, a circle gear mounted to the frame to rotate relative thereto, a moldboard coupled to the circle gear to rotate therewith, and a circle drive gearbox comprising gearing, a first worm, and a second worm, the gearing meshing with the circle gear, the first and second worms meshing with the gearing.

9 Claims, 8 Drawing Sheets

MULTI-WORM CIRCLE DRIVE GEARBOX

FIELD OF THE DISCLOSURE

The present disclosure relates to a work vehicle, such as, for example, a motor grader, having a circle drive for rotating a circle gear to which a moldboard is coupled.

BACKGROUND OF THE DISCLOSURE

A motor grader has a main frame, a draft frame coupled to the main frame for movement relative to the main frame, a circle gear mounted to the draft frame to rotate relative thereto about a central axis of the circle gear, a moldboard coupled to the circle gear to rotate with the circle gear, and a circle drive configured to rotate the circle gear relative to the draft frame.

A type of circle drive has a single-worm circle drive gearbox with a single worm that meshes with a worm gear operatively coupled to a pinion gear meshing with the circle gear, the worm and the worm gear providing a worm gear set of the circle drive. A single hydraulic motor of the circle drive is operatively coupled to the worm to apply torque to and rotate the worm gear set so as to rotate the circle gear and the moldboard coupled thereto selectively in opposite first and second directions about the central axis of the circle gear.

The worm gear set has a reduced useful life due to durability issues. The worm and the worm gear are made of dissimilar materials so that they do not weld themselves together during operation. The worm gear is made of a softer material than the worm so as to be the sacrificial part (e.g., worm gear made of high-strength manganese bronze and worm made of hardened steel). The sliding action between the worm and the worm gear causes wear on the worm gear, wear being a function of worm rotational speed and applied torque. As such, the worm gear eventually wears to the point of fracture, leading to downtime for replacement of the worm gear.

SUMMARY OF THE DISCLOSURE

According to the present disclosure, a work vehicle, such as, for example, a motor grader, comprises a frame, a circle gear mounted to the frame to rotate relative thereto, a moldboard coupled to the circle gear to rotate therewith, and a circle drive gearbox comprising gearing, a first worm, and a second worm. The gearing meshes with the circle gear. The first and second worms mesh with the gearing.

In an exemplary embodiment, the gearing comprises a worm gear, and the first and second worms mesh with the worm gear. The two worms and the worm gear provide a worm gear set.

The gearbox is included in a circle drive configured to rotate the circle gear relative to the draft frame. The circle drive further includes a hydraulic system configured to rotate the first and second worms. The hydraulic system comprises a hydraulic first motor and a hydraulic second motor. The first and second motors are flow-parallel to one another. The first motor is operatively coupled to the first worm. The second motor is operatively coupled to the second worm. Due to the flow-parallel arrangement, the circle drive is able to self-balance such that the worms apply the same torque to the worm gear and rotate at the same speed. Such operational equalization avoids seizure of the worm gear which may occur if the worms were not to balance in applied torque and rotational speed.

By way of comparison, assume, for example, that the first and second worms collectively apply the same overall torque (T) as the single worm of a single-worm circle drive gearbox. In such a case, each of the first and second worms individually applies approximately ½ (T) to the worm gear, rather than the full torque (T) as in the case of a single-worm. Due to such a torque reduction at each worm, compared to the single-worm circle drive gearbox, it is thought that the dual-worm circle drive gearbox would result in a reduced wear rate on the worm gear, increasing the useful life of the worm gear.

In another example, compared to a single worm that applies a torque (T) to the worm gear, use of two worms could increase the overall torque applied to the worm gear (e.g., 1.5 T) while still decreasing the individual torque applied by each worm to the worm gear (e.g., approximately 0.75 T). It is thought that this arrangement would result in a reduced wear rate, increasing the useful life of the worm gear.

The circle drive gearbox may have more than two worms (e.g., three), further dividing the torque applied by each worm to the worm gear. It is thought that this arrangement would result in a reduced wear rate on the worm gear, increasing the useful life of the worm gear.

The circle drive may actuate the worms in a number of other ways. For example, pneumatic or electric motors may be used in place of hydraulic motors. In another example, there may be a single motor (e.g., hydraulic, pneumatic, or electric) coupled mechanically to each worm via a differential. In yet another example, in lieu of a motor, the worms may be driven mechanically via a drive line from the engine or the transmission, with a differential between the drive line and the worms.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
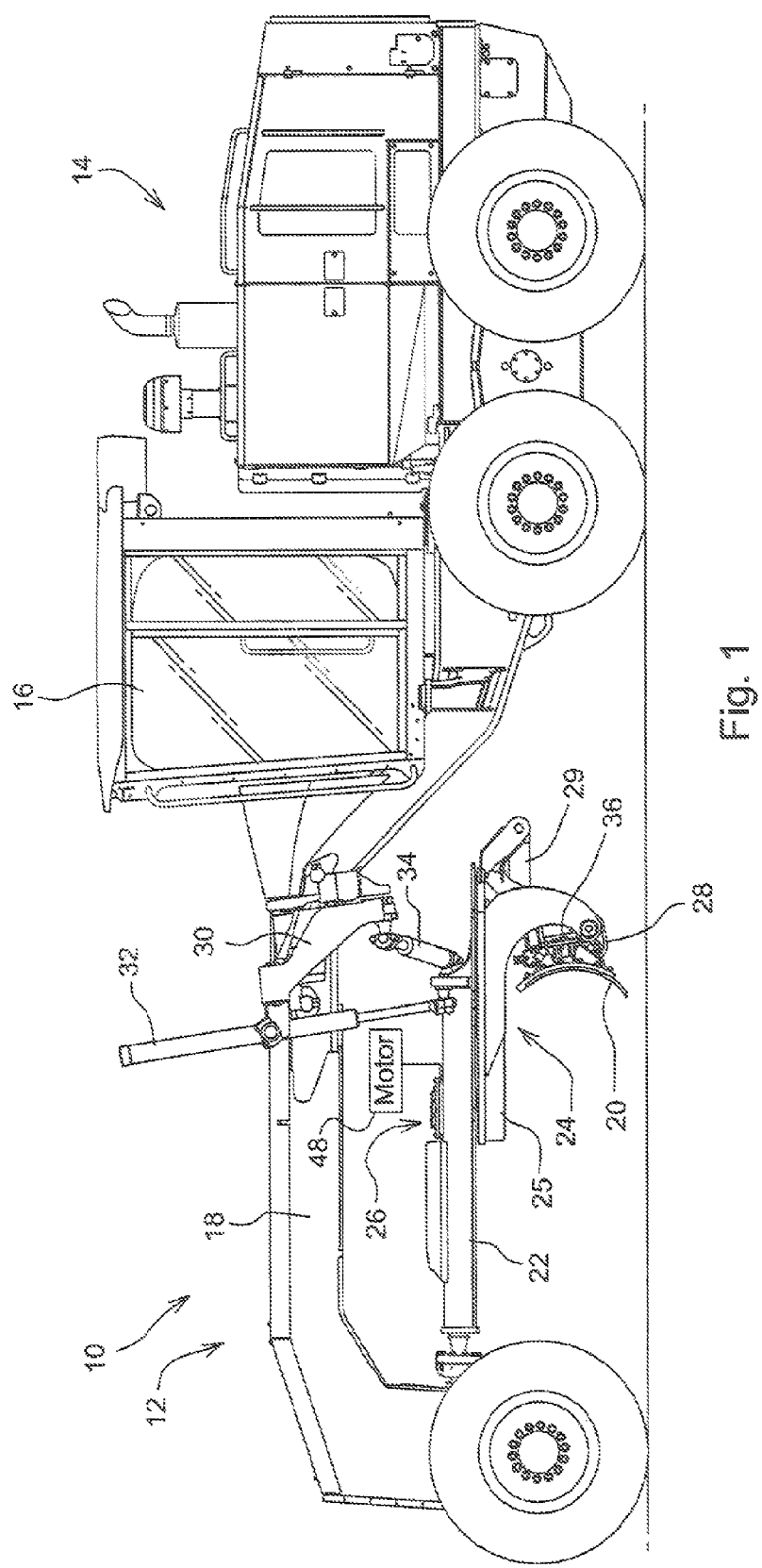
FIG. 1 is a side elevation view showing a work vehicle in the form of, for example, a motor grader.
Figure 2:
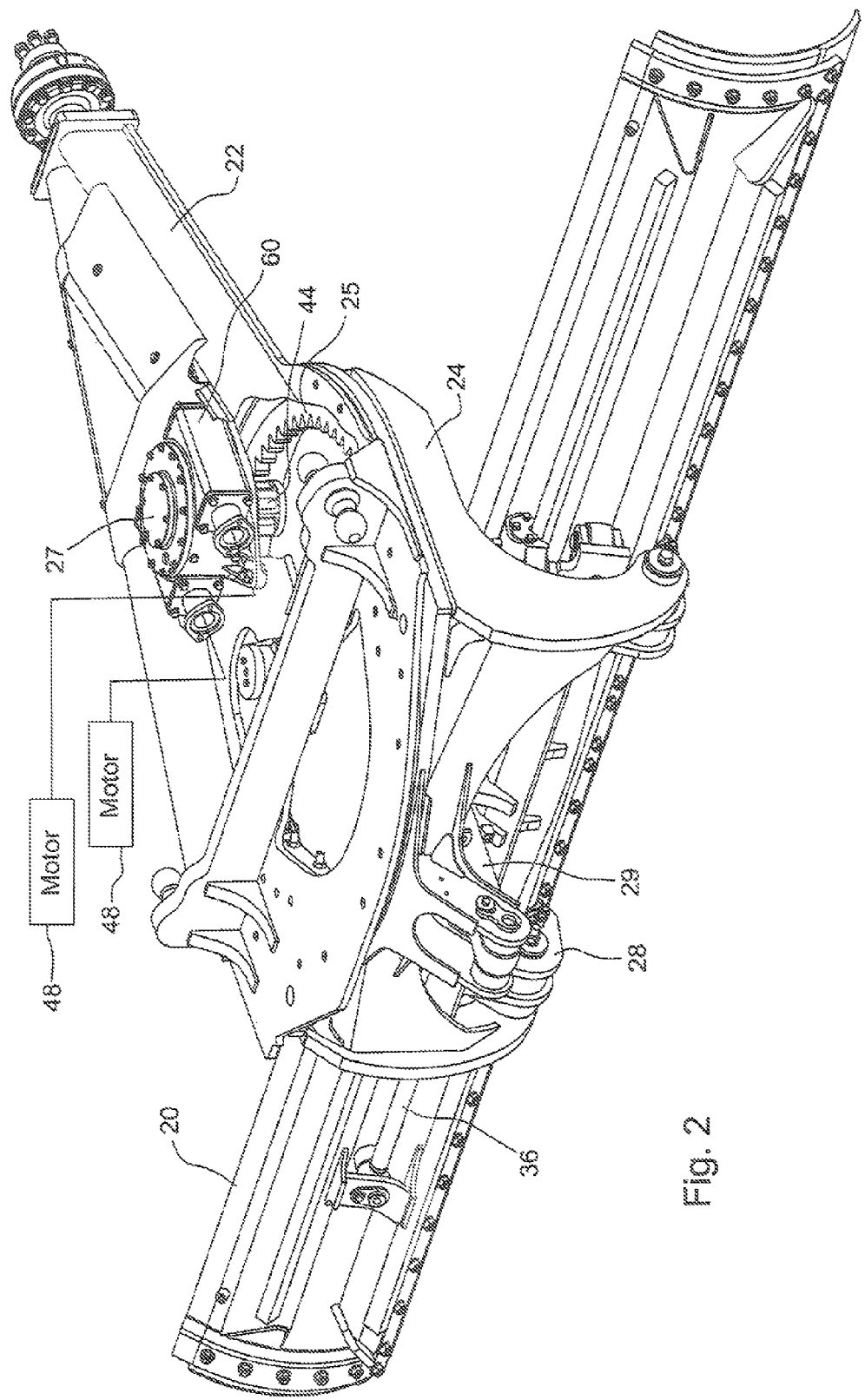
FIG. 2 is a perspective view showing a circle drive gearbox engaging a circle gear for rotation of a moldboard of the work vehicle.

Referring to FIGS. 1 and 2, there is shown respectively a work vehicle 10 and a sub-assembly thereof. By way of example, the vehicle 10 is illustrated and described below as a motor grader.

As a motor grader, the vehicle 10 has front and rear sections 12, 14. The front and rear sections 12, 14 are articulated to one another at an articulation joint for steering of the vehicle 10 left and right using a left articulation cylinder and a right articulation cylinder, the articulation cylinders coupled to and extending between the front and rear sections 12, 14. The rear section 14 includes the internal combustion engine (e.g., diesel engine) of the vehicle.

The vehicle 10 exemplarily has six ground-engaging wheels. The front section 12 has two wheels, a left front wheel and a right front wheel. The rear section 14 has four wheels, two left rear wheels arranged in a tandem and two right rear wheels arranged in a tandem.

The front section 12 has an operator's station 16 from which a human operator can control the vehicle 10. The operator's station is supported on the main frame 18 of the front section 12.

The front section 12 has a moldboard 20 mounted to the main frame 18 of the front section 12. The moldboard 20 is configured for moving earthen or other material.

The moldboard 20 is mounted for movement in a number of directions. A draft frame 22 is coupled to the main frame 18 toward the front via a ball-and-socket joint. A circle frame 24 is mounted to the draft frame 22 to rotate relative thereto about a central axis of a circle gear 25 of the circle frame 24 by use of a circle drive 26 having a multi-worm circle drive gearbox 27 engaging the circle gear 25. A tilt frame 28 holds the moldboard 20 and is coupled pivotally to the circle frame 24 for pivotal movement of the tilt frame 28 and the moldboard 20 held thereby relative to the circle frame 24 about a tilt axis by use of a tilt cylinder 29. The moldboard 20 is coupled to the circle frame 24 and thus its circle gear through the tilt frame 28 to rotate with the circle frame 24 and its circle gear relative to the draft frame 22.

A saddle 30 is mounted to the main frame 18. Left and right blade-lift cylinders 32 (only the left blade-lift cylinder is shown) are connected to the saddle 30 and the draft frame 22 therebetween for raising and lowering the sides of the draft frame 22, and thus the moldboard 20, relative to the main frame 18.

A circle side-shift cylinder 34 is connected to the saddle 30 and the draft frame 22 therebetween to side-shift the draft frame 22 and circle frame 24, and thus the moldboard 20, relative to the main frame 18. The tilt cylinder 29 is connected to the circle frame 24 and the tilt frame 28 therebetween to change the pitch of the tilt frame 28, and thus the moldboard 20, relative to the circle frame 24. A moldboard side-shift cylinder 36 is connected to the tilt frame 28 and the moldboard 20 therebetween and is operable to move the moldboard 20 in translation relative to the tilt frame 28 along a longitudinal axis of the moldboard 20.

Figure 3:
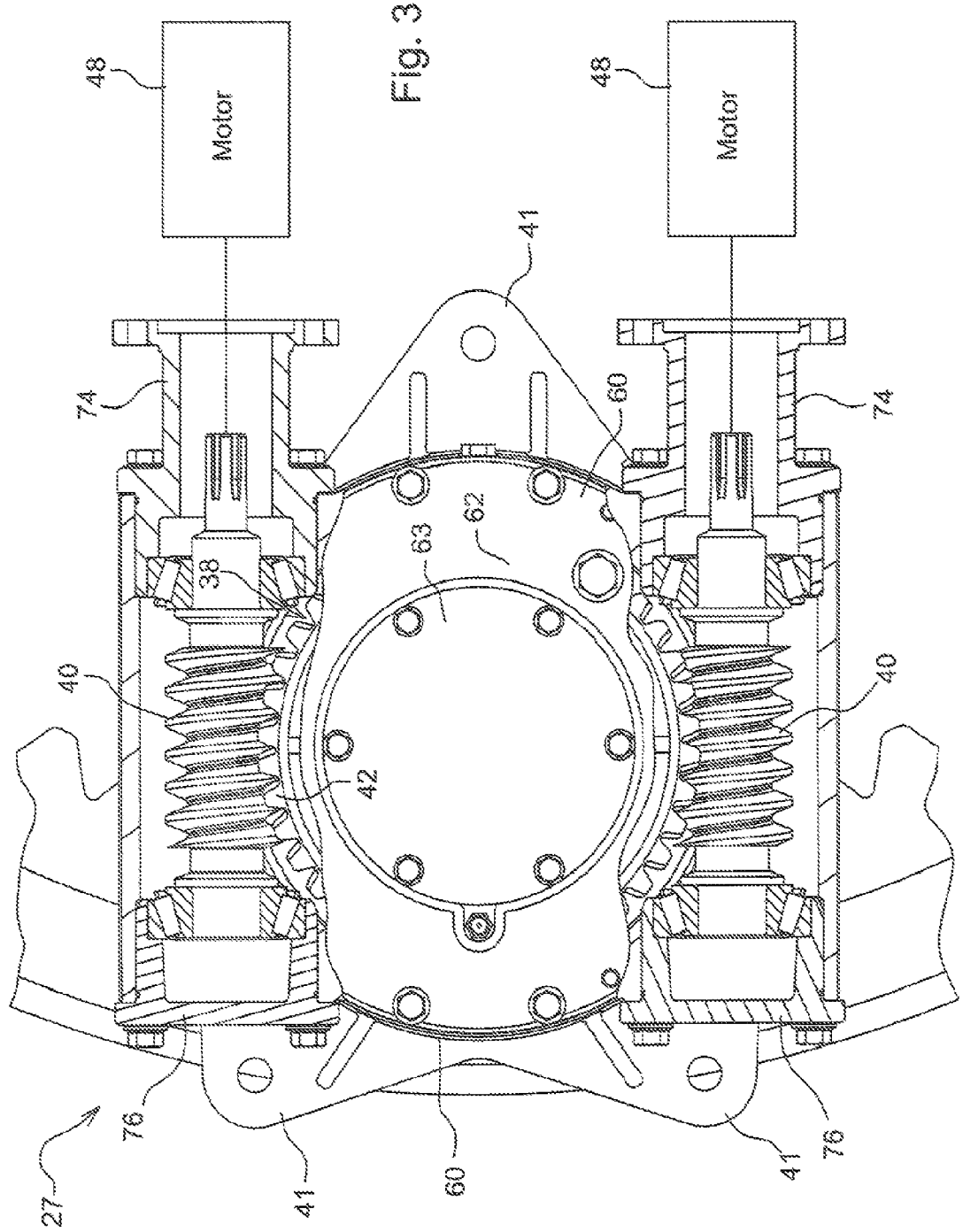
FIG. 3 is a top view of the circle drive gearbox, with portions broken away, showing two worms meshing with a worm gear.

Referring to FIG. 3, the circle drive 26 is configured to rotate the circle gear 25 and thus the moldboard 20 relative to the draft frame 22 about the central axis of the circle gear 25. In this embodiment, the circle drive 26 has a dual-worm circle drive gearbox 27. The gearbox 27 has gearing 38, a first worm 40, and a second worm 40. The gearing 27 meshes with the circle gear 25. The first and second worms 40 mesh with the gearing 27. The gearbox 27 may have, a number of mounting pads 41 extending outwardly from a housing 60 of the gearbox and fastened (e.g., using threaded fasteners) to the draft frame 22. There may be, for example, three such mounting pads 41.

Exemplarily, the gearing 38 includes a worm gear 42 and a pinion gear 44. The first and second worms 40 mesh with the worm gear 42. The worm gear 42 is operatively coupled to the pinion gear 44. The pinion gear 44 meshes with the circle gear 25. Each worm 40 may be made, for example, of hardened steel, and the worm gear 42 may be made, for example, of high-strength manganese bronze.

In the illustrated embodiment, the worms 40 are positioned on opposite sides of the worm gear 42 so as to be parallel, and are oriented to point in the same direction. The worms 40 are threaded with opposite senses. Such a configuration of the worms 40 facilitates packaging of the worms 40 and the motors 48 coupled respectively thereto on board the vehicle 10. Positioning the worms 40 on opposite sides of the worm gear 42 may help counter-balance the bearings 66 of the gearbox 27.

To facilitate other packaging arrangements, the worms 40 may be arranged in a variety of ways. For example, the worms 40 may be parallel to one another but oriented 180 degrees to one another, in which case the worms 40 may be threaded with the same sense, and the motors 48 may be positioned on opposite sides of the gearbox 27. In other examples, the worms 40 may be angled relative to one another in a generally V-shaped arrangement, the angle of the V shape dependent on packaging constraints and possibly the location of any mounting pads 41 about the housing 60 of the gearbox 27. In such a case, both of the motor ends of the worms 40 (i.e., the ends coupled to the motors 48) may be positioned toward the vertex of the V shape or may be positioned away from the vertex of the V shape, or one of the motor ends may be positioned toward the vertex with the other motor end positioned away from the vertex.

Figure 4:
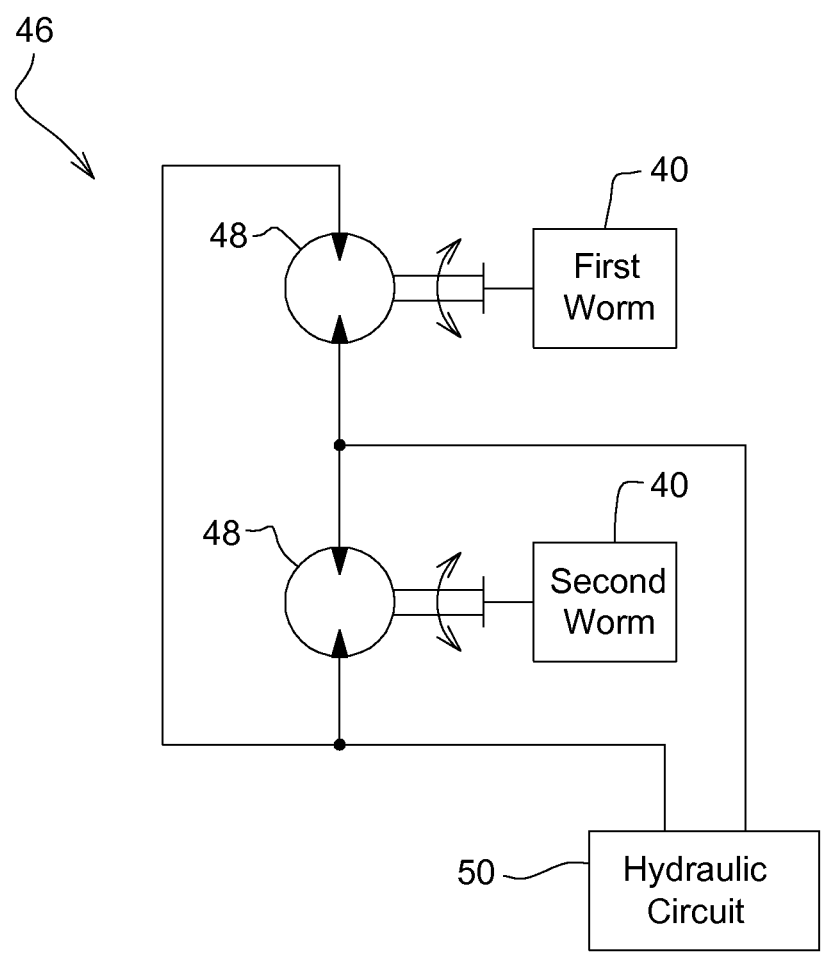
FIG. 4 is a simplified hydraulic schematic showing two hydraulic motors flow-parallel to one another and operatively coupled respectively to the two worms.

Referring to FIG. 4, the circle drive 26 further includes a hydraulic system 46 configured to rotate the first and second worms 40. The hydraulic system 46 includes a hydraulic first motor 48 and a hydraulic second motor 48. The first and second motors 48 are flow-parallel to one another and are operatively coupled respectively to the first and second worms 40 to rotate the worms 40. Due to the flow-parallel arrangement, the circle drive 26 is able to self-balance such that the first and second motors 48 produce the same or similar motor torque as one another, with the worms 40 applying corresponding torque to the worm gear 42 and rotating so as to avoid seizure of the worm gear 42. The motors 48 may not produce exactly the same torque as one another; rather the motor torques may be slightly different (e.g., up to 5% difference).

Assume, for example, that just before start-up of the gearbox 27 the thread of one of the worms 40 (the "ready worm") is positioned between adjacent teeth of the worm gear 42 (a lead tooth and a trailing tooth) such that the thread is contacting the forward flank of the lead tooth so as to be ready to apply torque to the worm gear 42 in a forward direction, whereas the thread of the other worm 40 (the "other worm") positioned between adjacent teeth (a lead tooth and a trailing tooth) is spaced slightly apart from the forward flank of the lead tooth so as not to be ready to apply torque to the worm gear 42 in the forward direction ("misalignment"). In the case of such misalignment, the flow-parallel arrangement will send flow to the side with the other worm 40 (i.e., that the side with least resistance) in order to rotate its thread into contact with the respective forward flank, while the ready worm 40 waits momentarily. During this initial stage, the rotational speed of the worms 40 may be unequal and the torque applied by the worms 40 may be low. The rotational speeds of the worms 40 equalize and the torque applied by the worms 40 rises in response to engagement by the other worm 40 with the respective forward flank. The flow-parallel arrangement thus naturally accommodates manufacturing tolerances and thread-tooth spacing between the worms 40 and worm gear 42 that may occur due to slight rotational shifting between the worms 40 and worm gear 42 during periods of circle drive inactivity.

The hydraulic system 46 has a hydraulic circuit 50 coupled fluidly to the motors 48. The hydraulic circuit 50 supplies pressurized hydraulic fluid to the motors 48 and receives return fluid from the motors 48. The circuit 50 can supply fluid in a direction to rotate the circle frame 24 and the moldboard 20 in a corresponding direction and supply fluid in an opposite direction to rotate the circle frame 24 and the moldboard 20 in a corresponding opposite direction.

The hydraulic circuit 50 may be configured in a variety of ways. For example, the circuit 50 may be a pressure-compensated, load-sense arrangement that serves a plurality of hydraulic functions, including the circle-rotate function. As such, it may have a pump (e.g., variable displacement or fixed displacement) for supplying pressurized hydraulic fluid to the functions and a reservoir for storing hydraulic fluid. It may have proportional directional control valves associated respectively with the functions and proportional compensator valves associated respectively with the functions. The directional control valves may include a directional control valve for controlling flow between the pump and the motors 48 and between the motors 48 and the reservoir, as well as the direction of such flow. The directional control valve may be, for example, manually operable or pilot operable. In the case of manually operable, the directional control valve may be coupled mechanically to a circle-rotate control (e.g., lever) at the operator's station. In the case of pilot operable, there may be two electro-hydraulic proportional pilot valves for controlling pilot flow to opposite ends of the control valve. The pilot valves may be under the control of an electric control unit, having one or more electric controllers, responsive to operator inputs via a circle-rotate control (e.g., lever) at the operators station.

The hydraulic motors 48 may be configured in any suitable manner. In an example, each hydraulic motor 48 is a gerotor motor, such as, for example an Eaton 2000 series gerotor motor from Eaton Corporation of Cleveland, Ohio [e.g., with a specification of M-02-062-BE-05-AA-01-0-00-1-0-00-00-00-AB-AC-F having a displacement of 6.2 cubic inches per revolution (i.e., about 100 cubic centimeters/revolution), a BE mounting type, and a SAE size A mounting flange to be fastened to the mounting flange of a connector 74 of the gearbox 27]. In other examples, each motor 48 may be an axial piston motor or a gear motor.

Figure 5:
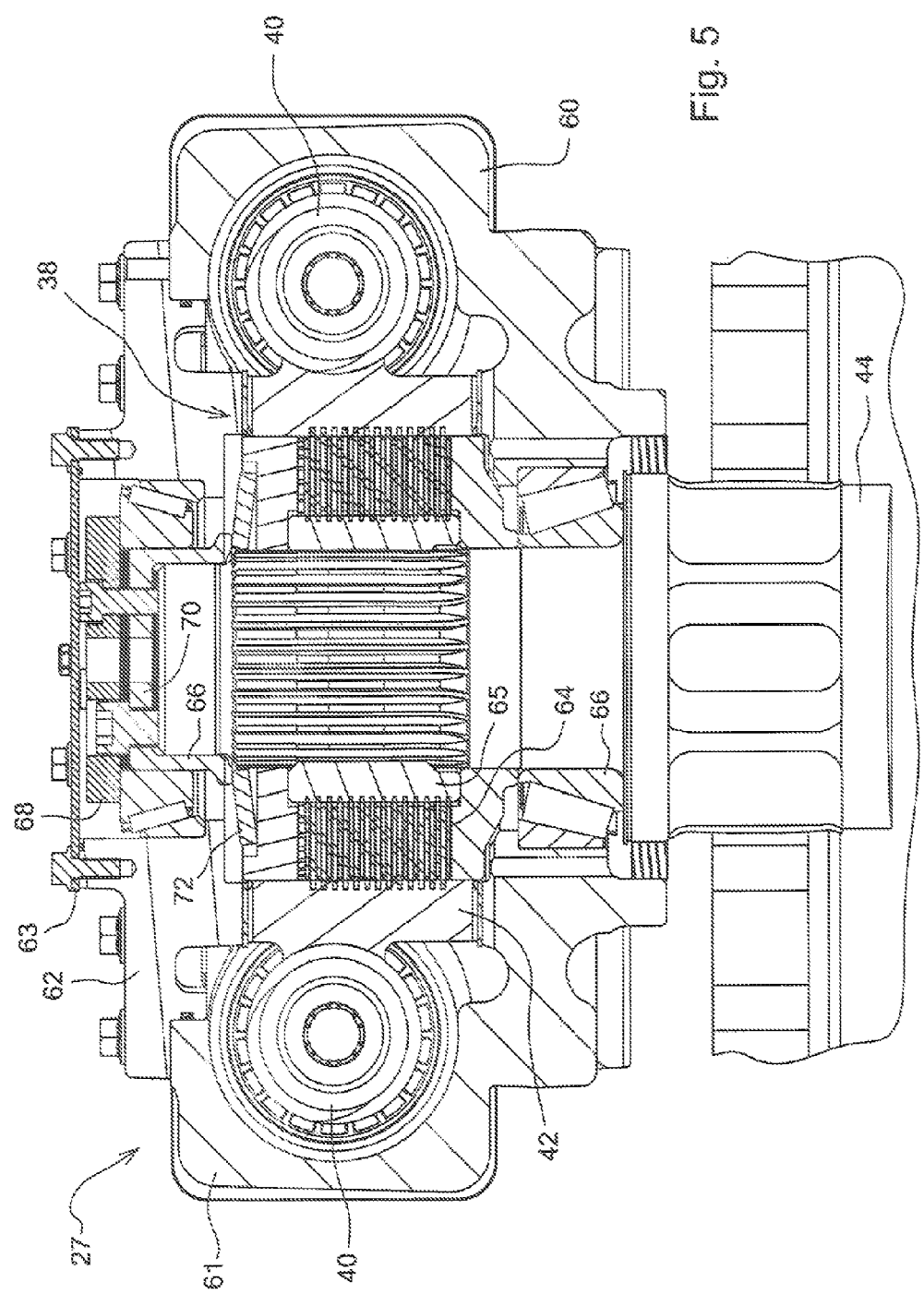
FIG. 5 is a sectional view taken along lines 5-5 of FIG. 3 showing the gearbox with a slip clutch.

The gearbox 27 may be configured with a slip clutch, as shown, for example, in FIG. 5 or without a slip clutch. The slip clutch protects, for example, the moldboard 20, circle frame 24, gearbox 27, and draft frame 22 from damage if the end of the moldboard 20 comes in contact with stationary, immovable objects.

Referring to FIG. 5, the gearbox 27 with the slip clutch, in the form of a wet slip clutch, is shown and is but one possible arrangement of a gearbox with a slip clutch. The gearbox 27 has a housing 60. The housing 60 includes a base 61, a cover 62 fastened to the base 61 using screws, and a cap 63 fastened to the cover using screws (two of such screws shown in section in FIG. 5 in which the threads of the screws and the corresponding threads of the holes receiving the screws are not shown for ease of illustration).

Each motor 48 is coupled mechanically to the gearbox 27. The motor 48 has a housing fastened to the gearbox housing 60. For example, the housing of each motor 48 has a mounting flange fastened (e.g., using two bolts and associated nuts and washers) to the mounting flange of a connector 74 of the housing 60, such connector 74 being fastened (e.g., using screws) to the base 61. The mounting flanges of the motors 48 and the connectors 74 may each be configured as an SAE size A mounting flange. The output shaft of the motor 48 is coupled mechanically to the worm 40. An end cap 76 is fastened (e.g., using screws) to the base 61 opposite the mounting flange 74.

The worms 40 and the worm gear 42 are positioned within the housing 60. Each worm 40 is positioned within the base 61 and is rotatable within a pair of tapered roller bearings (FIG. 3) captured respectively between the worm 40 and a mounting flange 74 and between the worm 40 and an end cap 76. The worms 40 mesh with the worm gear 42 which is positioned within the housing 60 between the base 61 and the cover 62 with a thrust washer positioned between the worm gear 42 and the base 61 and another thrust washer positioned between the worm gear 42 and the cover 62 for rotation of the worm gear 42 within the housing 60.

A clutch pack 64 is positioned radially between the worm gear 42 and an annular hub 65 splined to a shaft of the pinion gear 44. The clutch pack 64 has separator plates and clutch disks inter-digitating with the separator plates in frictional engagement therewith. The separator plates are splined to the worm gear 42. The clutch disks are splined to the hub 65, and each disk may have a core plate with frictional paper (not shown) on both sides of the plate.

The shaft of the pinion gear 44 is mounted for rotation within a pair of tapered thrust bearings 66. A retaining washer 68 is fastened to the shaft of the pinion gear 44 with a first set of screws (e.g., three screws) and is shimmed with a first set of shims between the washer 68 and a quill bearing 70 to establish a pre-load on the upper bearing 66. The quill bearing 70 is fastened to the shaft of the pinion gear 44 with a second set of screws (e.g., three screws) and is shimmed with a second set of shims between the quill bearing 70 and the end of that shaft to establish a pre-load on a spring 72 (e.g., Belleville spring).

The spring pre-load is transmitted to the clutch pack 64 via a pressure plate and a wear plate. The pressure plate engages the spring 72 on one side and engages the hub 65 and a wear plate on the other side. The wear plate is sandwiched between the pressure plate and the clutch pack 64.

On the other side of the clutch pack 64 is a backing plate. The backing plate engages the hub 65 and the clutch pack 64 on one side and engages one of the bearings 66 on the other side.

The spring pre-load normally causes engagement of the clutch pack 64 such that there is no slip between the worm gear 42 and the pinion gear 44. In the event that the spring pre-load is overcome due, for example, to an obstacle to rotation of the circle gear 25, the clutch pack 64 may slip allowing the worm gear 42 to rotate ahead of the pinion gear 44.

The interior of the housing 60, including the worm gear set with its worms 40 and worm gear 42, is lubricated with hydraulic oil or other suitable lubricant. Seals are provided, for example, between the cap 63 and the cover 62 (e.g., rubber O-ring), between the cover 62 and the base 61 (e.g., rubber O-ring truncated for ease of illustration to indicate compression during use), and between the base 61 and the pinion gear 44 (e.g., rubber ring). The housing 60 may be provided with a pressure relief valve.

The gearbox 27 may be configured without a clutch pack and associated components. In but one possible arrangement of such a clutchless gearbox, the gearbox has a housing including a base, a cover fastened to the base using screws, and a cap secured to the base (e.g., pressed into the cover).

Each motor 48 is coupled mechanically to the clutchless gearbox. The motor has a housing fastened to the gearbox housing. For example, the housing of each motor is fastened (e.g., using threaded fasteners) to a mounting flange of the gearbox housing which is fastened (e.g., using threaded fasteners) to the base. The output shaft of the motor is coupled mechanically to the worm. An end cap is fastened (e.g., using threaded fasteners) to the base opposite the mounting flange.

The worms and the worm gear are positioned within the housing 60 of the clutchless gearbox. Each worm is positioned within the base and is rotatable within a pair of tapered roller bearings captured respectively between the worm and one of the mounting flanges and between the worm and one of the end caps. The worms mesh with the worm gear which is positioned within the housing between the base and the cover with a thrust washer positioned between the worm gear and the base and another thrust washer positioned between the worm gear and the cover for rotation of the worm gear within the housing.

In the clutchless gearbox, the shaft of the pinion gear is mounted for rotation within a pair of tapered thrust bearings. A retaining washer is fastened to the shaft of the pinion gear with a set of screws (e.g., three screws) and is shimmed with a set of shims between the retaining washer and an end of the shaft to establish a pre-load on the upper bearing.

The interior of the housing of the clutchless gearbox, including the worm gear set with its worms 40 and worm gear 42, is lubricated with hydraulic oil or other suitable lubricant. Seals are provided, for example, between the cover and the base (e.g., rubber O-ring), and between the base and the pinion gear (e.g., rubber ring). The housing may be provided with a pressure relief valve.

It is understood that the gearing 38 may take the form of any suitable gearing between the worms 40 and the circle gear 25 that is configured to transmit torque inputted by the worms 40 to the circle gear 25. It is preferred that the gearing 38 include a single worm gear 42 with which the worms 40 mesh, but it is understood that there could be two worm gears, one for each worm, operatively coupled to the same pinion gear (in the event that there are more than two worms, there could be more than two worm gears, each worm gear for one or more worms). The clutch and clutchless embodiments of the connection between the worm gear 42 and the pinion gear 44 are but two examples of such connection. Further, the pinion gear 44 may take the form of any suitable pinion gear that is configured to transmit torque imparted to it to the circle gear 25.

In use, there may be a circle-rotate control (e.g., a lever) at the operator's station 16. An operator may actuate the circle-rotate control (e.g., move lever selectively fore or aft relative to a neutral position) to rotate selectively the moldboard 20 clockwise or counter-clockwise about the central axis of the circle gear 25. Actuation of the circle-rotate control causes pressurized fluid to advance to the two motors 48 in the direction corresponding to the direction of actuation of the circle-rotate control. In response thereto, the first motor 48 drives the first worm 40 and the second motor 48 drives the second worm 40, such that the first and second worms drive the gearing 38, or more particularly the worm gear 42 of the gearing 38. As such, the motors 48 rotate respectively the worms 40 which rotate the worm gear 42, the pinion gear 44, and thus the circle gear 25 and the moldboard 20 coupled thereto.

The circle drive 26 is configured to divide the overall torque ($T$) applied to the gearing 38 among the multiple worms 40. Each of the worms 40 applies a portion of the overall torque ($T$) to the worm gear 42. For example, in the case of a gearbox 27 with only two worms 40, the first worm 40 applies approximately ½ ($T$) to the worm gear 42, and the second worm 40 applies approximately ½ ($T$) to the worm gear 42.

The gearbox 27 thus has multiple worms 40. It is thought that use of multiple worms 40 will decrease the wear rate on the worm gear 42 so as to lengthen its useful life. As in the illustrated embodiment, the gearbox 27 may have only two worms 40. In other embodiments, the gearbox 27 may have more than two worms (e.g., three, or more), further dividing the torque applied by each worm 40 to the worm gear 42.

The motors may be the same in number as the worms. For example, in the case of two worms, there may be two motors operatively coupled respectively to the two worms. In the case of three worms, there may be three motors operatively coupled respectively to the three worms, and so on. The worms and, correspondingly, the motors may be spaced apart evenly about the gearbox, such as, for example, 180 degrees in the case of two worms and two motors or 120 degrees in the case of three worms and three motors.

The circle drive 26 may be configured in a number of ways. For example, as alluded to above, the worms 40 may be driven hydraulically. In another example, the worms 40 may be driven pneumatically using two pneumatic motors operatively coupled respectively to the two worms 40 and arranged in flow-parallel in lieu of the hydraulic motors. As such, the pneumatic motors may produce the same or similar motor torque as one another such that the worms 40 apply torque correspondingly to the worm gear 42. The pneumatic motors may not produce exactly the same torque as one another; rather the motor torques may be slightly different (e.g., up to 5% difference).

In yet another example, electric motors may be used in place of hydraulic or pneumatic motors. As such, there may be two electric motors operatively coupled respectively to the two worms 40. The electric motors may be controlled so as to produce the same or similar motor torque as one another such that the worms 40 apply torque correspondingly to the worm gear 42. The electric motors may not produce exactly the same torque as one another; rather the motor torques may be slightly different (e.g., up to 5% difference).

A suitable motor control system may be used for the electric motors. For example, the control system monitors the torque of the motors and applies a predetermined upper torque limit to the motors such that, if the torque of only one of the motors reaches the upper torque limit indicating that the thread of the worm 40 to which such motor is coupled is contacting the respective forward flank of the worm gear 42 but the thread of the other worm 40 is not contacting the respective forward flank of the worm gear 42, the motor control system causes the output shaft of the other motor to rotate so that the thread of the worm 40 coupled thereto contacts the respective forward flank. Motor torque can be sensed in any of several ways. For example, motor torque can be sensed by monitoring the motor current. As monitored motor current increases, the torque increases.

Figure 6:
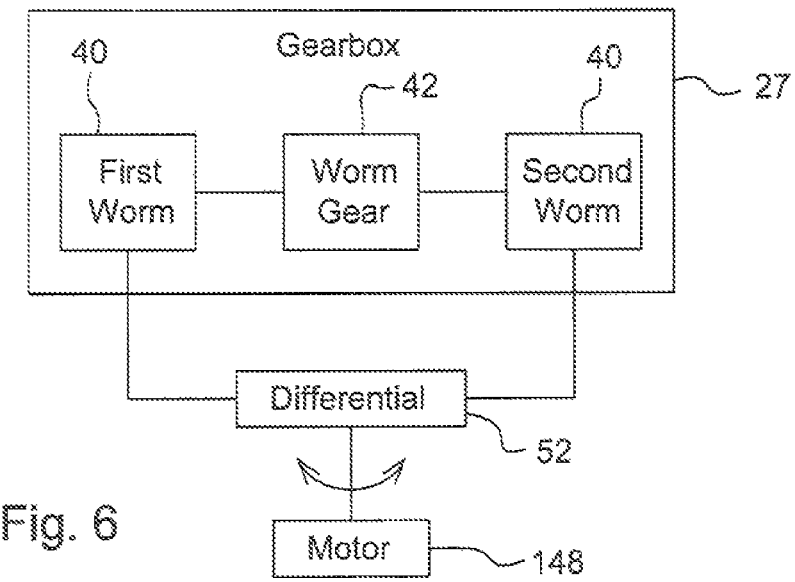
FIG. 6 is a diagrammatic view showing an embodiment with a single motor operatively coupled to the worms via a differential.

Referring to FIG. 6, in yet another example, the circle drive 26 may have a single motor 148 (e.g., hydraulic, pneumatic, or electric) coupled mechanically to each worm 40 (a single hydraulic motor may be driven by the hydraulic circuit 50). In the case of two worms, the output shaft of the single motor 48 is coupled to both worms 40 via a differential 52 (e.g., open differential), which transmits the same or similar torque to the worms 40 while allowing for rotational speed variation between the worms 40 until both worms 40 engage the respective forward flanks (e.g., at start-up of the gearbox).

The torque applied to the two worms 40 may not be exactly the same; rather the torques may be slightly different (e.g., up to 5% difference).

Figure 7:
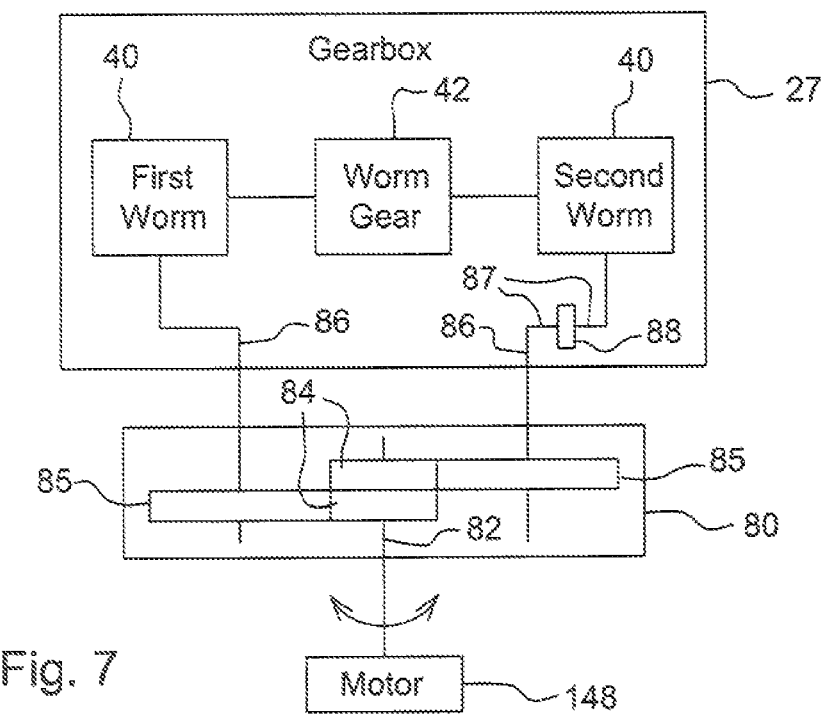
FIG. 7 is a diagrammatic view showing another embodiment with a single motor operatively coupled to the worms via a gearbox.

Referring to FIG. 7, in a variation of the embodiment of FIG. 6, there may be a gearbox 80 in lieu of a differential. The gearbox 80 may have an input 82 configured, for example, as a shaft coupled mechanically to the motor 148 such that the motor 148 is operatively coupled to the gearbox 80. The gearbox 80 may have two input gears 84 on the input 82 to rotate therewith. The gears 84 are coupled mechanically respectively to two output gears 85. The output gears 85 are coupled mechanically respectively to two outputs 86 of the gearbox 80. The outputs 86 are coupled mechanically respectively to the first and second worms 40.

To avoid seizure of the worm gear 42, one of the outputs 86 may be a multi-shaft output having two shafts 87 and an adjustable coupling 88 that couples the shafts 87 to one another and is configured to allow relative rotation between the two shafts 87 during set-up, while the other output 86 may be a single shaft rigidly coupled to the respective worm 40. In particular, prior to set-up, one or both of the worms 40 may not be positioned against the respective forward flanks of the worm gear 42.

To correct such misalignment, during set-up, the adjustable coupling 88 may be made loose so as to allow relative rotation between the two shafts 87 of the multi-shaft output 86, and, if needed, the single shaft of the single-shaft output 86 may be rotated so as to cause the associated worm 40 to engage the respective forward flank of the worm gear 42. Further, if needed, the shafts 87 of the multi-shaft output 86 may be individually rotated. The shaft 87 connected to the gearbox 27 may be rotated so as to cause the associated worm 40 to engage the respective forward flank of the worm gear 42. In addition, the shaft 87 connected to the gearbox 80 may be rotated so as to cause the gearing of the gearbox 80 to mesh properly. Afterwards, the adjustable coupling 88 may be tightened to connect the shafts 87 of the multi-shaft output 86 rigidly.

Figure 8:
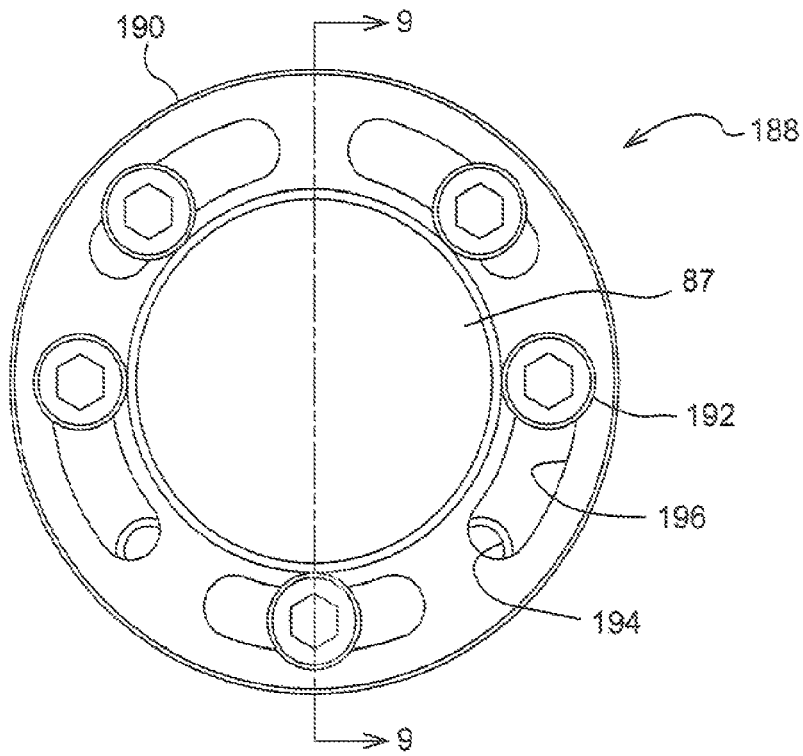
FIG. 8 is an elevation view of an adjustable coupling.
Figure 9:
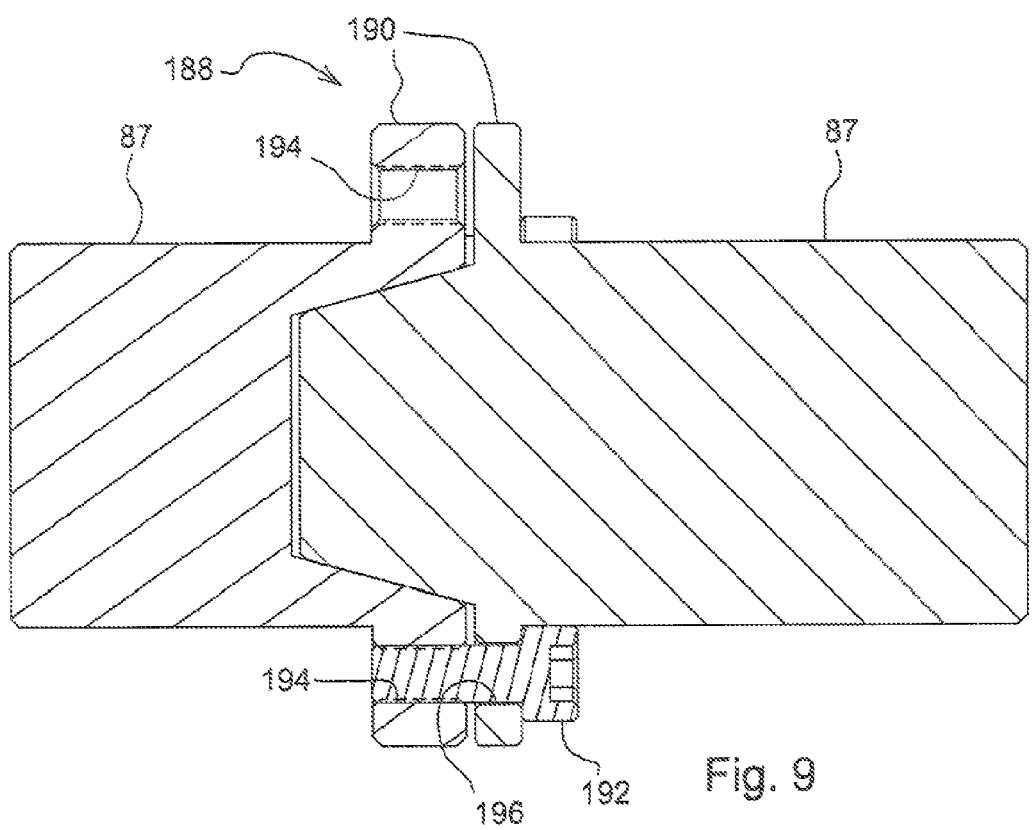
FIG. 9 is a sectional view taken along lines 9-9 of FIG. 8.

Referring to FIGS. 8 and 9, there is shown a first embodiment 188 of the adjustable coupling 88. The adjustable coupling 188 has a flange 190 at an end of each of the shafts 87. The two flanges 190 are joined to one another with fasteners 192 (e.g., socket head cap screws). The fasteners 192 extend respectively through threaded circular holes 194 in one of the flanges 190 (left flange of FIG. 9), whereas the other flange 190 (right flange of FIG. 9) has arcuate, elongated, slots 196 through which the fasteners 192 extend respectively.

During set-up, the fasteners 192 may be positioned in the slots 196 and the holes 194 but made loose so as to allow relative rotation between the two shafts 87 of the multi-shaft output 86 to correct misalignment in either gearbox 27, 80, and then tightened after any misalignment is corrected. When the fasteners 192 are tightened, a male frusto-conical portion of one of the shafts 87 (e.g., right shaft of FIG. 9) engages a female frusto-conical portion of the other shaft 87 (e.g., left shaft of FIG. 9). Alternatively, in lieu of the flanges 190 and the fasteners 192, there may be a single threaded fastener (e.g., cap screw) that extends through an unthreaded throughhole in one of the shafts 87 (e.g., the left shaft of FIG. 9) into a blind threaded hole in the other shaft 87 (e.g., the right shaft of FIG. 9) to connect the two shafts 87 together.

Figures 10, 11:
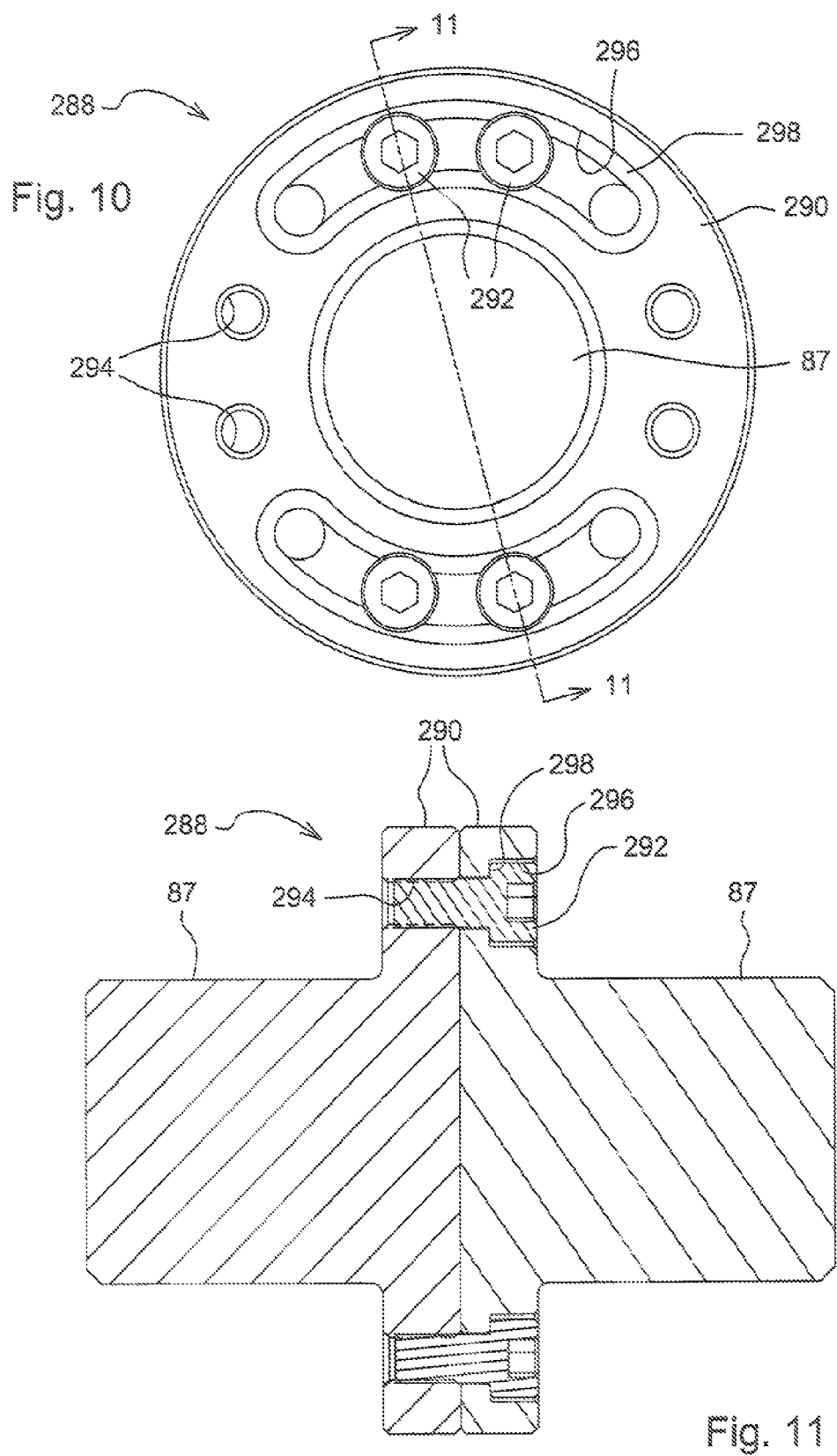
FIG. 10 is an elevation view of another adjustable coupling.
FIG. 11 is an elevation view taken along lines 11-11 of FIG. 10.

Referring to FIGS. 10 and 11, there is shown a second embodiment 288 of the adjustable coupling 88. The adjustable coupling 288 has a flange 290 at an end of each of the shafts 87. Each of the two flanges 290 has two sets of two threaded circular holes 294 and two arcuate; elongated slots 296. The two sets of holes 294 are positioned diametrically opposite one another, and the two slots 296 are positioned diametrically opposite one another, such that the two sets of holes 294 and the two slots 296 alternate with one another circumferentially about the flange 290. The two flanges 290 are joined to one another with fasteners 292 (e.g., sockets head cap screws). There are two fasteners 292 extending through each slot 296 of each flange 290 into respective holes 294 of the other flange 290. Each fastener 292 abuts a recessed shoulder 298 of the slot 296 through which it extends. During set-up, the fasteners 292 may be positioned in the slots 296 and the holes 294 but made loose so as to allow relative rotation between the two shafts 87 of the multi-shaft output 86 to correct misalignment in either gearbox 27, 80, and then tightened after any misalignment is corrected.

In lieu of a motor, the worms 40 may be driven mechanically through a drive line from the engine or the transmission. The drive line may be coupled to the two worms 40 via a differential.

The gearbox 27 may have a slip clutch or be clutchless with any of the foregoing variations of the circle drive 26.

While the disclosure has been illustrated and described in detail in the drawings and foregoing description (welds, hoses, and fastener threads not shown in drawings but understood), such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features, of the present disclosure and fall within the spirit and scope of the present invention as defined by the appended claims.

What is claimed is:

1. A work vehicle, comprising:
   a frame;
   a circle gear mounted to the frame to rotate relative thereto;
   a moldboard coupled to the circle gear to rotate therewith;
   a circle drive gearbox comprising gearing, a first worm, and a second worm, the gearing meshing with the circle gear, the first and second worms meshing with the gearing; and
   a hydraulic first motor and a hydraulic second motor, the first and second motors parallel to one another in a parallel flow arrangement from a common source, the first and second motors operatively coupled respectively to the first and second worms.

2. The work vehicle of claim 1, wherein the gearing comprises a worm gear, and the first and second worms mesh with the worm gear.

3. The work vehicle of claim 1, wherein the gearing comprises a worm gear and a pinion gear, the first and second worms mesh with the worm gear, the worm gear is operatively coupled to the pinion gear, and the pinion gear meshes with the circle gear.

4. The work vehicle of claim 1, wherein the work vehicle is a motor grader.

5. The work vehicle of claim 1, wherein the frame comprises a draft frame, the circle gear is mounted to the draft frame, the circle drive gearbox is mounted to the frame such that the first and second worms are positioned within a periphery of the draft frame.

6. A work vehicle, comprising:
   a frame;

a circle gear mounted to the frame to rotate relative thereto;
a moldboard coupled to the circle gear to rotate therewith;
a circle drive gearbox comprising gearing, a first worm, and a second worm, the gearing meshing with the circle gear, the first and second worms meshing with the gearing;
a motor; and
a transmission comprising an input, a first output, and a second output, the input operatively coupled to the motor, the first output operatively coupled to the first worm, and the second output operatively coupled to the second worm.

7. The work vehicle of claim 6, wherein the transmission is a differential.

8. The work vehicle of claim 6, wherein the work vehicle comprises an adjustable coupling, the transmission is a gearbox, the adjustable coupling operatively couples the second output to the second worm, and the adjustable coupling is configured to selectively allow rotation between the second output and the second worm.

9. The work vehicle of claim 8, wherein the adjustable coupling comprises a first flange and a second flange, the first flange comprises at least two arcuate elongated slots, the second flange comprises at least two holes, and the slots and the holes are configured such that fasteners may pass through the slots and the holes and operatively couple the first flange to the second flange across a range of relative rotational angles.

* * * * *